(12) United States Patent         (10) Patent No.:     US 7,777,734 B2
Tsai et al.                       (45) Date of Patent:    Aug. 17, 2010

(54) LIQUID CRYSTAL DISPLAYER FOR PREVENTING THE GENERATION OF MOISTURE

(75) Inventors: Chin-Shiong Tsai, Taoyuan Shien (TW); Wen-Yi Tang, Taoyuan Shien (TW); Wen-Chin Kuo, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 563 days.

(21) Appl. No.: 11/845,875

(22) Filed: Aug. 28, 2007

(65) Prior Publication Data

US 2009/0058817 A1    Mar. 5, 2009

(51) Int. Cl.
*G06F 3/041* (2006.01)
(52) U.S. Cl. .................. 345/173; 345/87; 349/58; 361/681
(58) Field of Classification Search ............ 345/87, 345/102, 156, 173; 349/12, 56, 58, 141; 361/681, 730, 742, 752, 758, 796
See application file for complete search history.

(56) References Cited

U.S. PATENT DOCUMENTS

| | | | | |
|---|---|---|---|---|
| 5,739,880 A * | 4/1998 | Suzuki et al. | | 349/110 |
| 6,914,640 B2 * | 7/2005 | Yu | | 349/12 |
| 6,958,800 B2 * | 10/2005 | Hoshino | | 349/150 |
| 6,972,750 B2 * | 12/2005 | Yu | | 345/173 |
| 7,148,944 B2 * | 12/2006 | Kinoshita et al. | | 349/158 |
| 7,575,773 B2 * | 8/2009 | Ishizuka et al. | | 427/58 |
| 2007/0040816 A1 * | 2/2007 | Toyomaki | | 345/174 |
| 2008/0079697 A1 * | 4/2008 | Lee et al. | | 345/173 |

* cited by examiner

*Primary Examiner*—Kimnhung Nguyen
(74) *Attorney, Agent, or Firm*—Chun-Ming Shih; HDLS IPR Services

(57) ABSTRACT

A liquid crystal displayer for preventing the generation of moisture includes a front cover, a touch panel, a nameplate, a partitioning plate and a liquid crystal displayer module. With the partitioning plate dividing a region between the touch panel and the liquid crystal displayer module into a first space and a second space, the first space is smaller, whereas the second space is larger. After the liquid crystal displayer module is supplied with electricity, the hot air staying in the first space is less. Further, the heat-obstructing effect of the partitioning plate causes the hot air not to condense in the second space, and thus it is not easy to generate a temperature difference from the external environment, thereby preventing the generation of mist.

5 Claims, 4 Drawing Sheets

LIQUID CRYSTAL DISPLAYER FOR PREVENTING THE GENERATION OF MOISTURE

BACKGROUND OF THE INVENTION

1. Field of the Invention

The present invention relates to a displayer, and in particular to a displayer for preventing the generation of moisture.

2. Description of Prior Art

Modern liquid crystal displayer module (LCM) is applied to small-sized electronic devices, and in addition, it can be widely used in common machines. Since the required brightness of the liquid crystal displayer is increasing, the working temperature of the liquid crystal displayer becomes higher and higher. If it is necessary to arrange a transparent touch panel or a protective glass piece in front of the liquid crystal displayer and such assembly is located in a high-humidity environment for a period of time, there may be a problem that the moisture is attached on the glass piece to cause an obstacle to human vision after the liquid crystal displayer is supplied with electricity.

When the liquid crystal displayer operates in an environment without constant temperature and humidity control or in an environment that is merely controlled to a constant temperature state, it is prone to accumulate humidity within the machine during the idle period. When the humidity is accumulated to a certain extent, after re-starting the machine, the moisture may condense therein due to the temperature difference between the internal and external environments.

The reason for generating a mist in the conventional liquid crystal displayer (as shown in FIGS. 1 and 2) is that a layer of dust-proof piece 40 is arranged between a liquid crystal displayer module 50 and a front cover 10 during the assembly of the liquid crystal displayer, thereby avoiding from contacting the front cover 10 directly. In front of the front cover 10, a touch panel 20 and a nameplate 30 are also provided. However, such arrangement generates a closed space 60. After being used in an environment having certain humidity, the high temperature of the liquid crystal displayer module may cause the increase in the temperature of the closed space 60, which is not easy to be dissipated away and thus generates a temperature difference from the external environment to cause the generation of mist. Since the dust-proof piece 40 is a cushioning sponge that can prevent the dust only but cannot efficiently dissipate the heat generated by the liquid crystal displayer module 50. Therefore, the humidity may remain in the closed space 60 to a certain extent, thereby accelerating the response time for condensing the moisture on the glass surface of the touch panel 20. At this time, the environmental condition is that the moisture has reached the saturated vapor pressure thereof and the temperature of the glass surface of the touch panel 20 is close to that of external environment (the temperature thereof is lower). Therefore, the phenomenon of generating mist may occur.

The existing solution for the mist generated in the liquid crystal displayer is to light up the liquid crystal displayer by using low-temperature lamp tubes. In this way, after starting the liquid crystal displayer, the heat of the lamp tubes may not cause the temperature difference between the internal and external environments to become too large, thereby preventing the condensation of moisture. However, this kind of liquid crystal displayer has a certain degree of technical threshold. Further, the material source thereof is not easy to obtain and the price is higher, increasing the production cost. Another solution is to insulate the external moisture from penetrating into a closed space formed by assembling the liquid crystal displayer with the touch panel. Therefore, even the temperature difference between the internal and external temperature is relatively large, no moisture can reach the saturated vapor pressure thereof to condense the mist. However, such solution is complicated, not easy to assemble and low in efficiency. Therefore, it cannot efficiently control the internal closed space to insulate completely from the existence of any moisture.

SUMMARY OF THE INVENTION

In order to solve the drawbacks of prior art, the present invention provides a partitioning plate that is made of PET or glass material and is arranged between a front cover and a liquid crystal displayer module. With this arrangement, the heat generated by the liquid crystal displayer module can be dissipated away and thus hot air may not stay within the liquid crystal displayer. As a result, it is not easy to generate a temperature difference from the external environment and thus the mist will not be generated. Since the partitioning plate is made of any one of a transparent plastic material (PET) or glass, the light-transmitting efficiency thereof is excellent, and the temperature at which it can endure is high. Further, the source of such materials is abundant and is easy to get, thereby reducing the production cost.

The present invention is to provide a liquid crystal displayer for preventing the generation of moisture, which includes a front cover, a touch panel, a nameplate, a partitioning plate and a liquid crystal displayer module. The front cover has a frame body thereon, and the back surface of the frame body is provided with an enclosing wall. The interior of the enclosing wall is formed with an accommodating space for accommodating the partitioning plate and the liquid crystal displayer module. The front surface of the side frame is provided with a recessed connecting portion for assembling with the touch panel. The nameplate is provided on the front surface of the frame body of the front cover and is arranged to correspond to the touch panel. With the partitioning plate dividing a region between the touch panel and the liquid crystal displayer module into a first space and a second space, the first space formed between one side face of the partitioning plate to a recessed region of the liquid crystal displayer module is smaller, whereas the second space formed between the other side face of the partitioning plate to one side face of the touch panel is larger. After the liquid crystal displayer module is supplied with electricity, the hot air generated will be dissipated away via the connecting portion between the liquid crystal displayer module and the partitioning plate, and thus the mount of hot air staying in the first space is less. Further, the heat-obstructing effect of the partitioning plate causes the hot air not to condense in the second space, and thus it is not easy to generate a temperature difference from the external environment, thereby preventing the generation of mist.

DETAILED DESCRIPTION OF THE INVENTION

The technical contents and detailed description of the present invention will be explained with reference to the accompanying drawings.

Figure 1:
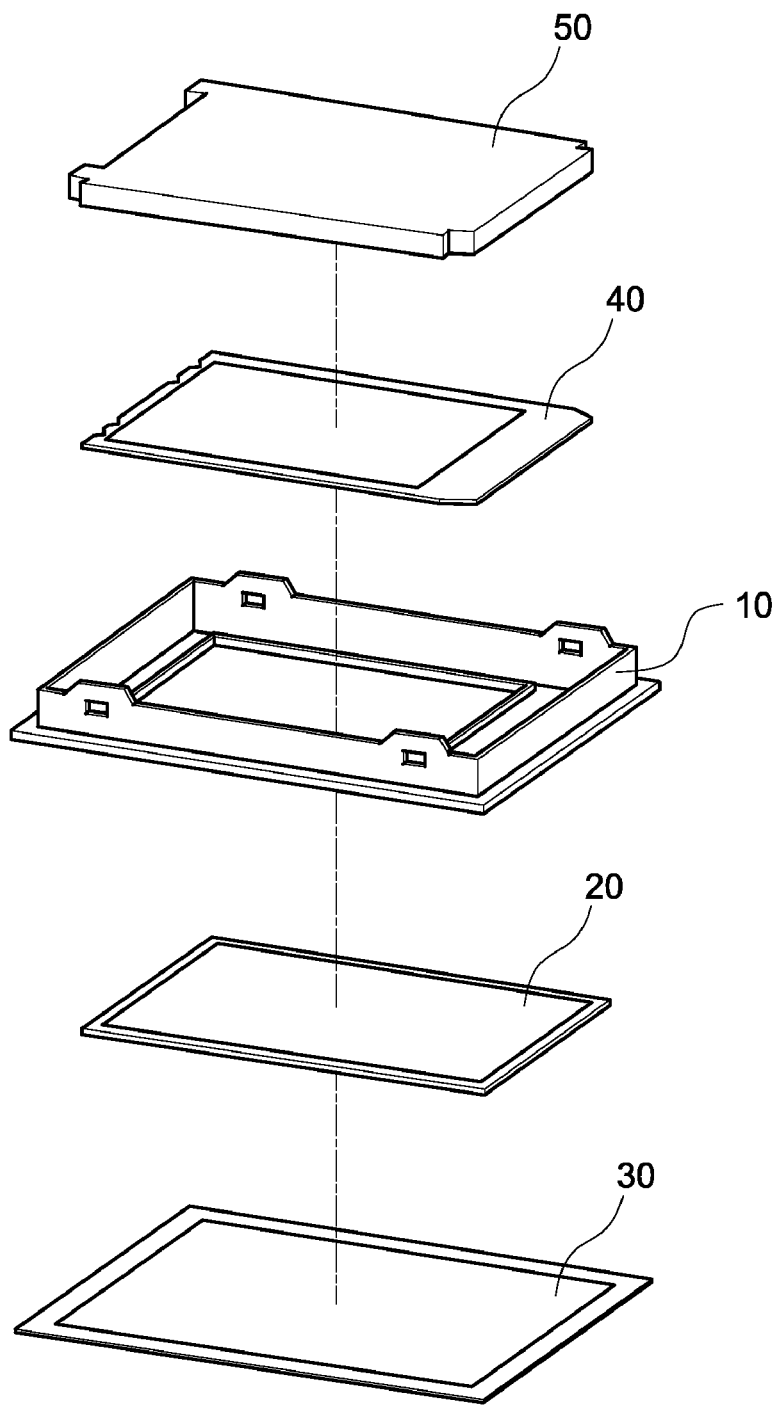
FIG. 1 is an exploded view showing the structure of a conventional liquid crystal displayer.
Figure 2:
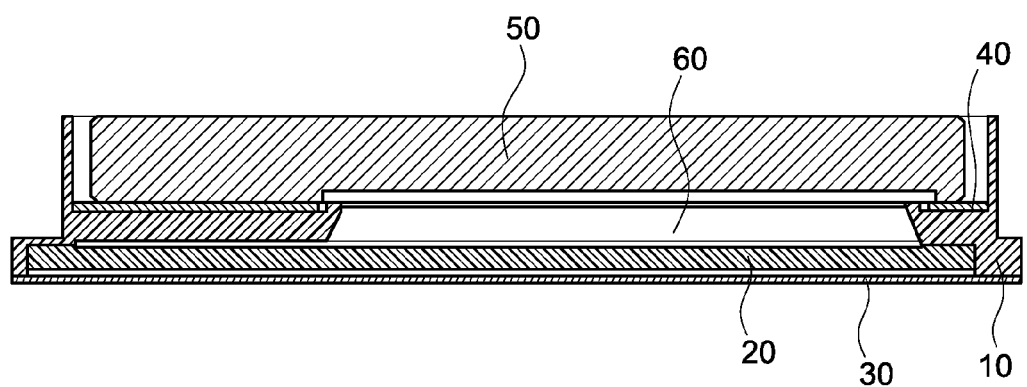
FIG. 2 is an assembled cross-sectional view showing the structure of a conventional liquid crystal displayer.
Figure 3:
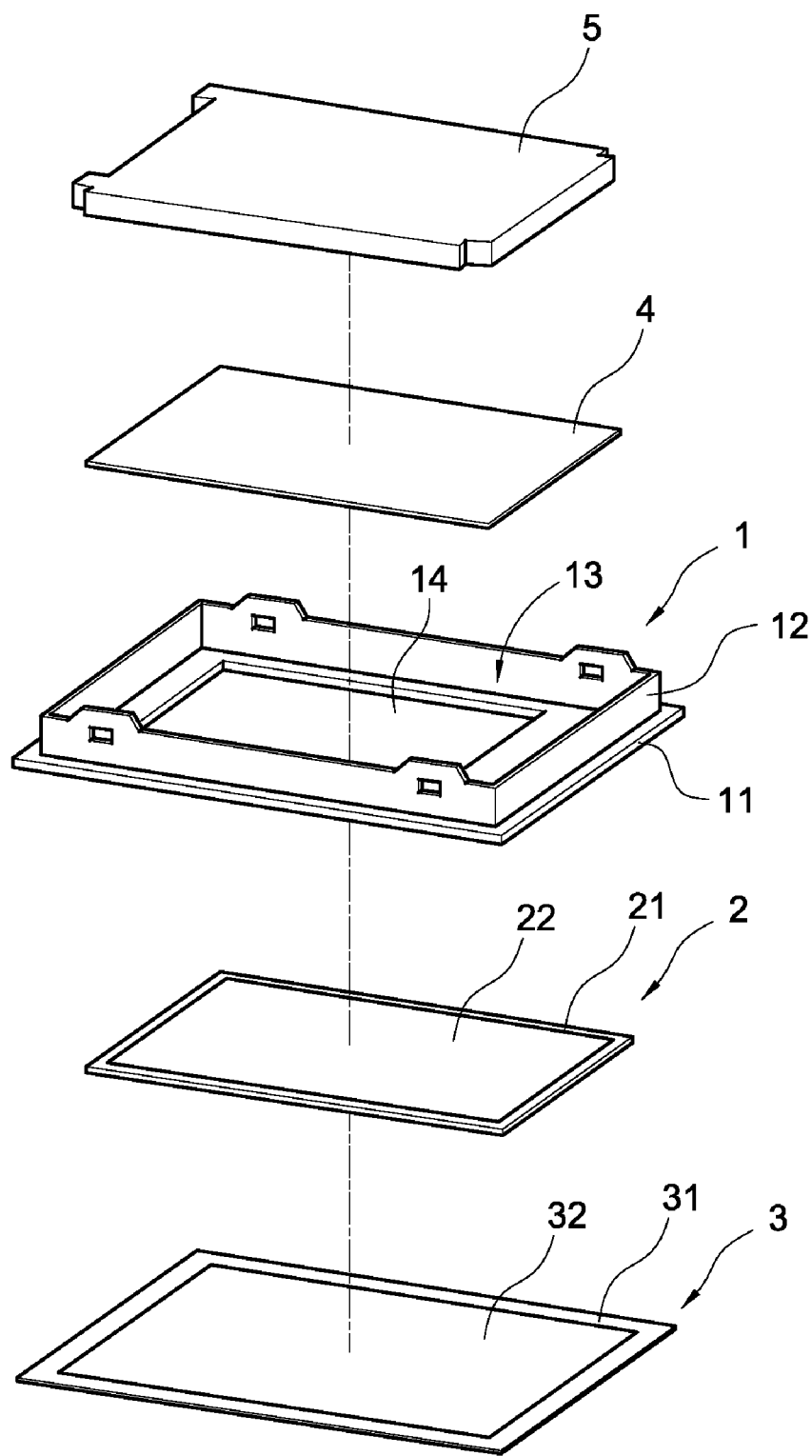
FIG. 3 is an exploded view showing the structure of the liquid crystal displayer of the present invention.

With reference to FIG. 3, it is an exploded view showing the structure of the liquid crystal displayer of the present invention. As shown in this figure, according to the present invention, the liquid crystal displayer for preventing the generation of the moisture includes a front cover 1, a touch panel 2, a nameplate 3, a partitioning plate 4 and a liquid crystal displayer module (LCM) 5.

Figure 4:
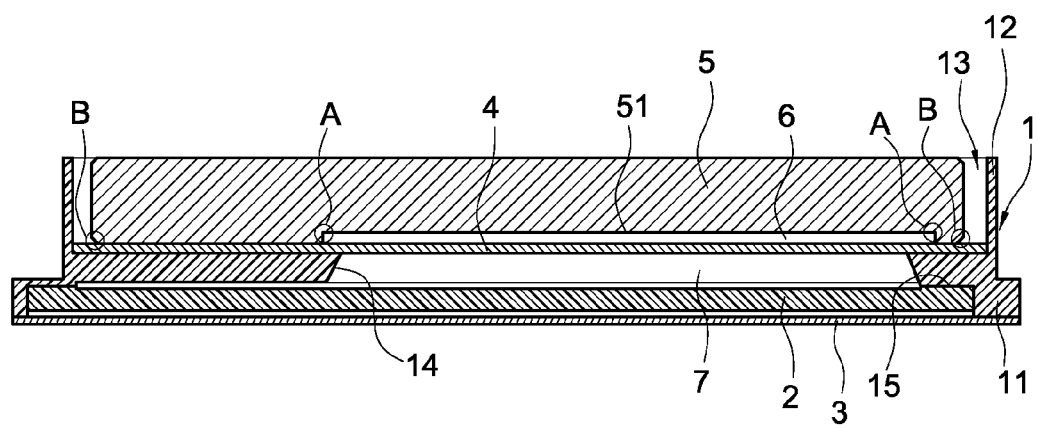
FIG. 4 is an assembled cross-sectional view showing the structure of the liquid crystal displayer of the present invention.

The front cover 1 is made of a plastic material and has a frame body 11 thereon. The back surface of the frame body 11 is provided with an enclosing wall 12. The enclosing wall 12 is formed therein with an accommodating space 13 for accommodating the partitioning plate 4 and the liquid crystal displayer module 5. Further, the frame body 11 has an opening 14 thereon. The opening 14 is located in the enclosing wall 12, thereby allowing a user to see pictures displayed by the liquid crystal displayer module 5. Further, the front surface of the frame body 11 is provided with a recessed connecting portion 15 (as shown in FIG. 4) for assembling with the touch panel 2.

The touch panel 2 is arranged in the connecting portion 15. The periphery of the touch panel 2 is provided with a side frame 21. The interior of the side frame 21 is formed with a transparent region 22 for allowing the user to see the pictures displayed by the liquid crystal displayer module 5. In addition, it also allows the user to perform various functions of the electronic device under touch control. In the drawings, the touch panel 2 is any one of a resistor type or capacitor type touch panel.

The nameplate 3 is arranged on the front surface of the frame body 11 of the front cover 1, and is arranged to correspond to the touch panel 2. The periphery of the nameplate 3 is provided with a side frame 31. The side frame 31 is formed therein with a perspective region 32 for allowing the user to see the pictures displayed by the liquid crystal displayer module 5.

The partitioning plate 4 is made of any one a transparent plastic material (PET) or glass, and is arranged on the frame body 11 within the enclosing wall 12 of the front cover 1.

The liquid crystal displayer module (LCM) 5 is arranged in the enclosing wall 12 of the front cover 1, and is arranged in such a manner that corresponds to and contacts one side face of the partitioning plate 4.

With inherent properties of the material of the above-mentioned partitioning plate 4, when the liquid crystal displayer module 5 operates, the high temperature generated by the liquid crystal displayer module 5 will not cause the touch panel 2 provided in the front thereof to generate moisture.

With reference to FIG. 4, it is an assembled cross-sectional view showing the structure of the liquid crystal displayer of the present invention. As shown in this figure, according to the present invention, in the liquid crystal displayer for preventing the generation of the moisture, after the front cover 1, the touch panel 2, the nameplate 3, the partitioning plate 4 and the liquid crystal displayer module 5 are completely assembled in this order, the partitioning plate 4 is used to abut against the liquid crystal displayer module 5, thereby dividing the region between the touch panel 2 and the liquid crystal displayer module 5 into a first space 6 and a second space 7.

Since the first space 6 formed between one side face of the partitioning plate 4 and a recessed region 51 of the liquid crystal displayer module 5 is smaller, the amount of the moisture contained therein is less. On the other hand, since the second space 7 formed between the other side face of the partitioning plate 4 and one side face of the touch panel 2 is larger, the amount of the moisture contained therein is more.

After the liquid crystal displayer module 5 is supplied with electricity, hot air may be generated at the positions A embedding lamp tubes (not shown) in the liquid crystal displayer module 5. The hot air generated will be dissipated away through the distal ends of the abutting positions B between the liquid crystal displayer module 5 and the partitioning plate 4. As a result, the amount of hot air staying in the first space 6 is less. Further, with the heat-obstructing effect of the partitioning plate 4, the hot air will not condense in the second space 7, and thus it is not easy to generate a temperature difference from the external environment, thereby preventing the generation of mist.

Since the partitioning plate 4 is made of any one of a transparent plastic material (PET) or glass, the light-transmitting efficiency thereof is excellent, and the temperature at which it can endure is high. Further, the source of such materials is abundant and is easy to get, thereby reducing the production cost.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A liquid crystal displayer for preventing generation of moisture, comprising:
    a front cover having a frame body thereon, a back surface of the frame body being provided with an enclosing wall, an interior of the enclosing wall being formed with an accommodating space, the frame body further having an opening thereon, the opening being located in the enclosing wall, a front surface of the frame body being provided with a recessed connecting portion;
    a touch panel arranged in the connecting portion, a periphery of the touch panel being provided with a side frame, the side frame being formed with a transparent region therein;
    a partitioning plate arranged on the frame body within the enclosing wall;
    a liquid crystal displayer module arranged in the enclosing wall in such a manner that the liquid crystal displayer module corresponds to and contacts one side face of the partitioning plate;
    wherein with the partitioning plate dividing a region between the touch panel and the liquid crystal displayer module into a first space and a second space, after the liquid crystal displayer module is supplied with electricity, hot air generated will be dissipated away through a abutting portion between the liquid crystal displayer module and the partitioning plate, and thus the hot air does not condense in the second space, it is not easy to generate a temperature difference from the external environment, thereby preventing the generation of moisture.

2. The liquid crystal displayer for preventing the generation of moisture according to claim 1, wherein the front cover is made of a plastic material.

3. The liquid crystal displayer for preventing the generation of moisture according to claim 1, wherein the partitioning plate is made of a transparent plastic (PET).

4. The liquid crystal displayer for preventing the generation of moisture according to claim 1, wherein the partitioning plate is made of a transparent glass.

5. The liquid crystal displayer for preventing the generation of moisture according to claim 1, wherein a nameplate is arranged on the front surface of the frame body to correspond to the touch panel, a periphery of the nameplate is provided with a side frame, the side frame is formed therein with a perspective region.

\* \* \* \* \*